United States Patent
Richardson et al.

(10) Patent No.: US 9,010,720 B2
(45) Date of Patent: Apr. 21, 2015

(54) THERMALLY COMPENSATED VALVE TRIM APPARATUS

(75) Inventors: Jonathan Wesley Richardson, Marshalltown, IA (US); Justin Paul Goodwin, Nevada, IA (US); Jesse Creighton Doyle, Ames, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 490 days.

(21) Appl. No.: 13/051,356

(22) Filed: Mar. 18, 2011

(65) Prior Publication Data

US 2012/0235069 A1 Sep. 20, 2012

(51) Int. Cl.
*F16K 25/00* (2006.01)
*F16K 1/48* (2006.01)

(52) U.S. Cl.
CPC .................................. *F16K 1/487* (2013.01)

(58) Field of Classification Search
CPC ............... F16K 1/32; F16K 1/34; F16K 1/48; F16K 1/482; F16K 1/1485; F16K 1/487
USPC ............ 251/318, 356, 366–368, 358, 85, 324
See application file for complete search history.

(56) References Cited

U.S. PATENT DOCUMENTS

| | | | |
|---|---|---|---|
| 1,034,882 A | 8/1912 | Crane | |
| 2,004,012 A | 6/1935 | Reed | |
| 2,479,688 A * | 8/1949 | Lindgren | ........................ 251/86 |
| 2,687,273 A | 8/1954 | Starkey | |
| 2,742,254 A | 4/1956 | Banker et al. | |
| 2,786,487 A * | 3/1957 | Spence | .................... 137/625.36 |
| 3,281,114 A | 10/1966 | Milleville | |
| 3,305,208 A | 2/1967 | Bredtschneider | |
| 3,550,903 A | 12/1970 | Hauser | |
| 3,572,633 A * | 3/1971 | Gaffney | ........................ 251/356 |
| 3,914,952 A | 10/1975 | Barbier | |
| 3,963,221 A | 6/1976 | Yi | |
| 4,142,543 A | 3/1979 | Krause et al. | |
| 4,248,403 A * | 2/1981 | Scull | ............................... 251/85 |

(Continued)

FOREIGN PATENT DOCUMENTS

DE  27 25 110 A1  12/1978
EP  1 757 850 A1  2/2007

OTHER PUBLICATIONS

Patent Cooperation Treaty, "International Search Report," issued by the International Searching Authority in connection with PCT application No. PCT/US2012/023804, mailed Apr. 25, 2012 (3 pages).

(Continued)

*Primary Examiner* — Marina Tietjen
(74) *Attorney, Agent, or Firm* — Hanley, Flight & Zimmerman, LLC

(57) ABSTRACT

Thermally compensated valve trim apparatus are disclosed. An example valve trim apparatus includes a valve plug having a recess, an insert fixed in the recess and having an opening therein. The insert is made of a material having a greater strength than a second material of the valve plug. The example valve trim apparatus also includes a valve stem having a threaded end disposed in the opening of the insert to form a valve stem connection, and a spacer operatively coupled to the valve plug and vale stem to affect a load exerted on the valve stem connection in response to a change in temperature.

18 Claims, 4 Drawing Sheets

(56) References Cited

U.S. PATENT DOCUMENTS

| | | | |
|---|---|---|---|
| 4,274,433 A | | 6/1981 | Schnall |
| 4,815,698 A | | 3/1989 | Palmer |
| 5,210,382 A | * | 5/1993 | Paley et al. .................. 181/209 |
| 5,232,323 A | * | 8/1993 | Baehre ......................... 411/178 |
| 6,302,374 B1 | * | 10/2001 | Fink ........................... 251/335.3 |
| 7,387,292 B1 | * | 6/2008 | Fleming ....................... 251/357 |
| 2004/0178375 A1 | * | 9/2004 | Schmaltx ......................... 251/7 |
| 2006/0013670 A1 | * | 1/2006 | Sullivan et al. ................ 411/155 |
| 2009/0146096 A1 | | 6/2009 | Davies, Jr. et al. |

OTHER PUBLICATIONS

Patent Cooperation Treaty, "Written Opinion of the International Searching Authority," issued by the International Searching Authority in connection with PCT/US2012/023804, mailed Apr. 25, 2012 (5 pages).

* cited by examiner

THERMALLY COMPENSATED VALVE TRIM APPARATUS

FIELD OF THE DISCLOSURE

The present disclosure relates generally to control valves and, more specifically, to a thermally compensated valve trim apparatus.

BACKGROUND

Control valves are commonly used in process control systems. In general, a control valve may be used to manipulate a flowing fluid to regulate a process variable to a desired set point, to convey or deliver a fluid from a source to a destination, etc. A sliding stem control valve assembly typically includes a valve plug, a valve stem, and an actuator to provide the motive power via the valve stem to operate the valve (e.g., to position the plug or flow control member within the valve).

The valve trim includes a valve stem connection that couples or fastens the valve stem to the valve plug. In typical sliding stem valves, a threaded end of the valve stem is threaded directly into a central aperture of the valve plug. In an alternative sliding stem valve, a threaded end of the valve stem passes through a central aperture of the valve plug, and one or more mechanical fastening elements (e.g., washers, nuts, bolts, etc.) are used to clamp or otherwise fix the valve plug to the valve stem.

In operation, control valves may be subjected to high temperatures. At such high temperatures, the valve stem connection may become overloaded and/or loosen the valve stem from the valve plug, which may cause a valve stem connection failure.

SUMMARY

In accordance with one example, a valve trim apparatus includes a valve plug having a recess, an insert fixed in the recess and having an opening therein. The insert may be made of a material having a greater strength than a second material of the valve plug. The valve trim apparatus may also include a valve stem having a threaded end disposed in the opening of the insert to form a valve stem connection, and a spacer operatively coupled to the valve plug and vale stem to affect a load exerted on the valve stem connection in response to a change in temperature.

In accordance with another example, a valve trim apparatus includes a valve plug having an aperture, a valve stem having a threaded end disposed in the aperture of the valve plug to form a valve stem connection, and a spring washer operatively coupled to the valve plug and the valve stem to affect a load exerted on the valve stem connection in response to a change in temperature.

DETAILED DESCRIPTION

Figure 1:
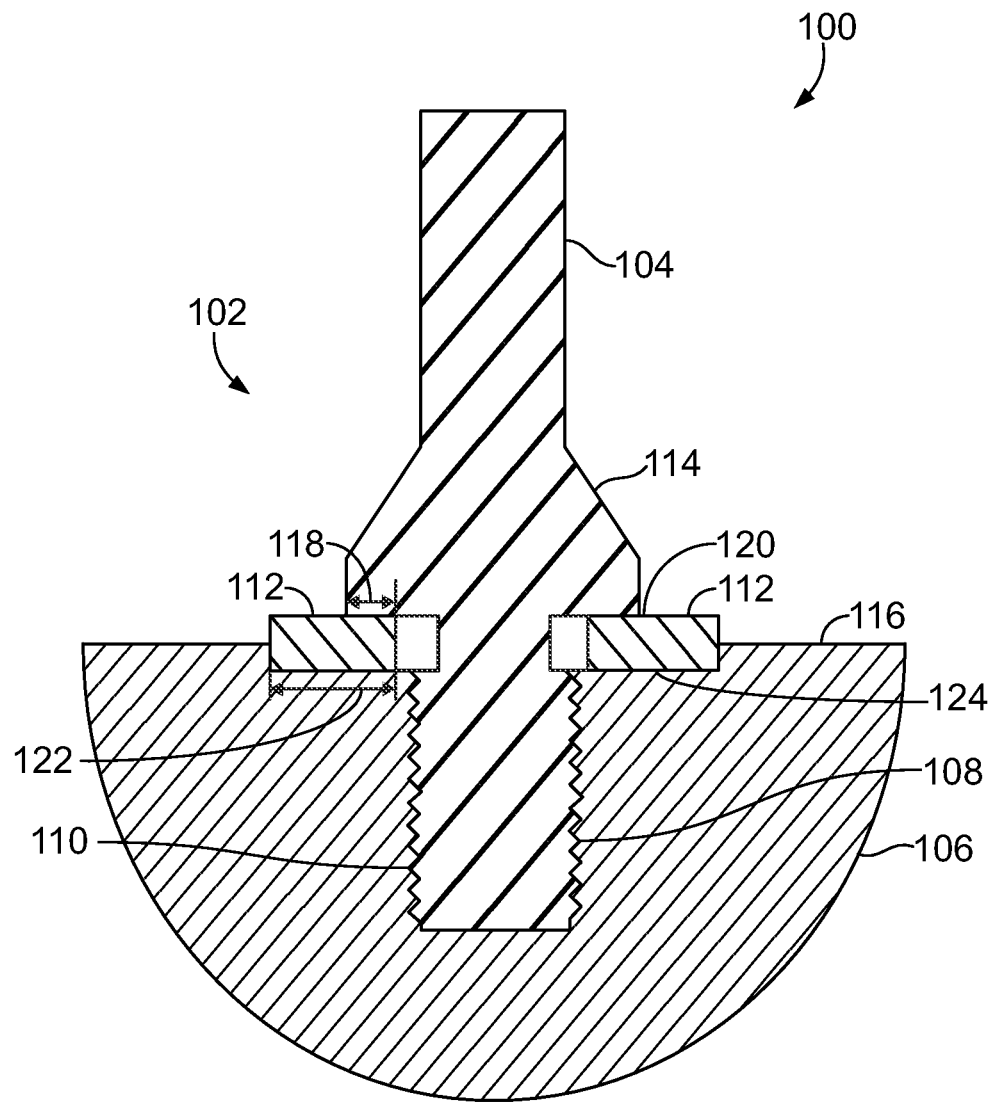
FIG. 1 is a cross-sectional view of a known valve trim apparatus.

The example valve trim apparatus to couple valve stems to valve plugs described herein maintain the integrity of the connection between the valve stem and valve plug at elevated temperatures where many known valve stem and plug connections would otherwise fail. More specifically, the example valve trim apparatus may employ one or more thermal spacers and/or spring washers that are responsive to temperature changes to maintain or increase the load on the connection between the valve stem and the valve plug, particularly as the ambient and/or operating temperature associated with the valve trim apparatus increases. The thermal spacers and/or spring washers may be captured between a surface of the valve plug and a fastener on an end of the valve stem such that as the ambient and/or operating temperature changes, a thickness and/or effective height of the thermal spacers and/or spring washers changes to compensate for dimensional changes of the valve plug and/or valve stem to maintain the load on the valve stem and plug connection. Thus, the thermal spacers and/or spring washers are selected to have thermal coefficient(s) of expansion and/or spring rates that effectively thermally compensate the load on the valve stem and plug connection, particularly at elevated temperatures. In cases where multiple thermal spacers and/or multiple spring washers are used, the thermal coefficients and/or spring rates may be the same or different for each spacer or washer. However, the combination of the thermal coefficients and/or spring rates provides an effective change in height or thickness that thermally compensates for the dimensional changes of the valve plug and/or valve stem.

The example valve trim apparatus described herein may additionally employ an insert that is fixed in a recess or opening of the valve plug to provide a high strength material interface at the valve stem and plug connection. In some examples, the insert is threaded into a threaded centrally disposed aperture in the valve plug and the valve stem passes through a central opening of the insert to form a valve stem connection. In this manner, the high stresses associated with load of the valve stem connection are borne initially by the high strength material of the insert rather than directly by the relatively weaker material of the valve plug. In other words, the insert is made of a material that can withstand the high stresses associated with the concentrated or localized forces imparted by the load on the valve stem connection and, in turn, due to its size, spreads those stresses or localized forces over a greater area at the interface between the insert and the valve plug. Thus, the inserts described herein may be used in conjunction with the above-noted thermal spacers and/or spring washers to further improve the integrity of valve stem connections over a wide range of ambient or operating temperatures. Further, because the insert can be made of a relatively small amount of material (i.e., compared to the amount of material needed to form a valve plug), expensive high-strength materials, such as Inconel and the like, can be employed to provide a high strength material interface for the valve stem connection in a cost-effective manner.

Before describing the example valve trim apparatus mentioned above, a brief description of a known valve stem connection is provided below in connection with FIG. 1. As depicted in FIG. 1, a valve trim apparatus 100 has a valve stem connection 102. The valve stem connection 102 shown in FIG. 1 mechanically couples or fastens a valve stem 104 to a valve plug 106. In FIG. 1, a threaded end portion 108 of the valve stem 104 is threaded into a central aperture 110 of the valve plug 106 to fix the central portion of the valve plug 106 to the valve stem 104. A hardened washer 112 is coupled to the valve stem connection 102 such that the washer 112 is captured between a shoulder 114 of the valve stem 104 and an upper surface 116 of the valve plug 106. The washer 112 spreads the load associated with the valve stem connection 102.

In particular, the hardened washer 112 is selected to withstand the high stresses imparted by a relatively small contact area 118 of the shoulder 114 to a surface 120 of the washer 112. In turn, the contact force imparted to the surface 120 of the washer 112 is distributed over a significantly larger area 122 of an opposing surface 124 of the washer 112, thereby reducing the contact stresses between the washer 112 and the valve plug 106.

Figure 2:
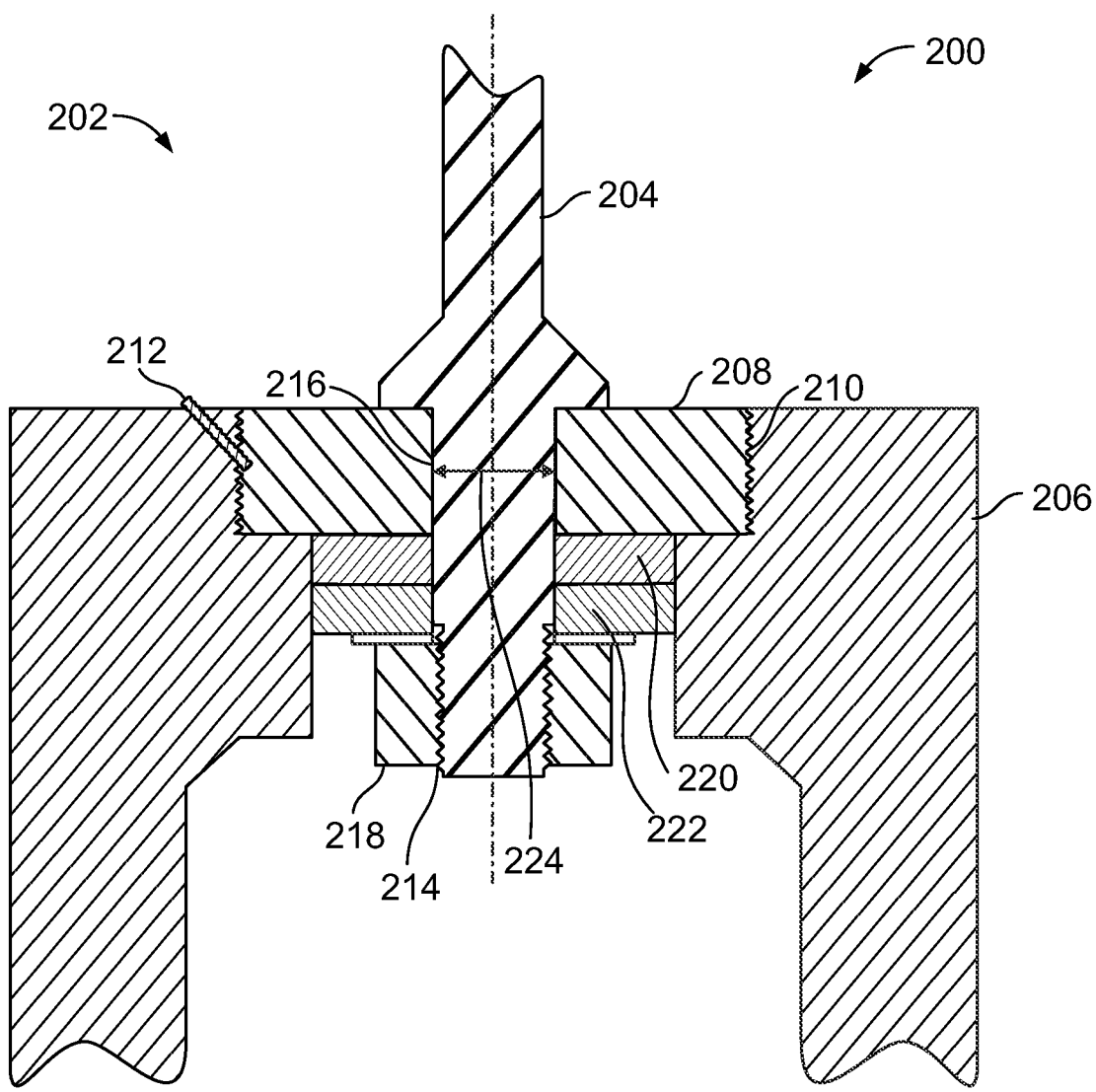
FIG. 2 is a cross-sectional view of an example thermally compensated valve trim apparatus.

FIG. 2 is a cross-sectional view of an example thermally compensated valve trim apparatus 200. As depicted in FIG. 2, the example valve trim apparatus 200 includes a thermally compensated valve stem connection 202. The example thermally compensated valve stem connection 202 shown in FIG. 2 mechanically couples or fastens a valve stem 204 to a valve plug 206. The example valve trim apparatus 200 also includes an insert 208 that is fixed within an opening or recess 210 of the valve plug 206. A wall of the recess 210 is threaded and a peripheral edge of the insert 208 is threaded to enable the insert 208 to be threadably engaged with the recess 210. Additionally, a pin 212, or any other fastening method, may be used to prevent the insert 208 from rotating and backing out of and/or moving further into the valve plug 206.

As shown in FIG. 2, a threaded end portion 214 of the valve stem 204 passes through an opening or recess 216 of the insert 208 and a mechanical fastening element 218 (e.g., a nut) is used to load the valve stem connection 202 and prevent the stem 204 from rotating relative to the valve plug 206. Spacers 220 and 222 are coupled to the valve trim apparatus 200 such that the spacers 220 and 222 are captured between the insert 208 and the mechanical fastening element 218 along the valve stem 204. Alignment of the valve stem 204 with the valve plug 206 may be achieved by maintaining a tight tolerance between a diameter 224 of the valve stem 204 and the diameter of the opening 216 of the insert 208.

The example valve trim apparatus 200 of FIG. 2 includes the insert 208 and the spacers 220 and 222 to maintain the integrity of the valve stem connection 202 at elevated temperatures, such as, for example, temperatures exceeding 1000° F. At elevated temperatures, many known valve stem connections can experience failure (e.g., a failure of a threaded connection) due to weakening of the plug material. To reduce the likelihood of a valve stem connection failure due to weakening of the plug material, particularly at elevated temperatures, the insert 208 may be made of a high strength material, such as ASTM B637 NO7718, for example, Inconel 718, which maintains its strength at elevated temperatures. Additionally, while the valve plug 206 may be manufactured entirely out of such a high strength material, utilizing a high strength insert 208 in the valve trim apparatus 200 eliminates the need to manufacture the entire valve plug 206 out of a high strength material, which is often expensive and unavailable in large, bar form for machining. The insert 208 utilizes a thread size that is significantly larger in diameter than a traditional valve stem connection, allowing for substantially more area over which the valve stem connection forces can be spread and resulting in reduced stresses on the plug material.

A valve stem connection may also experience thread failure at elevated temperatures due to conflicting thermal expansions between the valve stem 204 and the valve plug 206. The example valve trim apparatus 200 includes the spacers 220 and 222 to affect a load exerted on the valve stem connection 202 in response to a change in temperature (i.e., an elevated temperature due to operating conditions). In particular, the spacers 220 and 222 can be engineered such that, as ambient or operating temperatures increase, a summation of the thermal expansion rates of each spacer 220 and 222 can substantially compensate for the thermal expansion(s) of the valve stem 204 and the valve plug 206 to maintain the integrity (e.g., tightness) of the valve stem connection 202 at elevated temperatures. The spacers 220 and 222 can be designed using various materials and various dimensions to fine tune the load bearing capabilities of the valve trim apparatus 200. The spacers 220 and 222 may be constructed using any material with suitable thermal expansion coefficients or expansion rates, such as, for example, 300 series stainless steel. Further, while two spacers 220 and 222 are shown in FIG. 2, any other number of spacers or a single spacer may be used. Additionally, while FIG. 2 shows both the high strength insert 208 and the spacers 220 and 222 being used to maintain the integrity of the valve stem connection 202 at elevated temperatures, some examples may use the spacers 220 and 222 and a valve plug 206 that does not use an insert (e.g., the insert 208).

Figure 3:
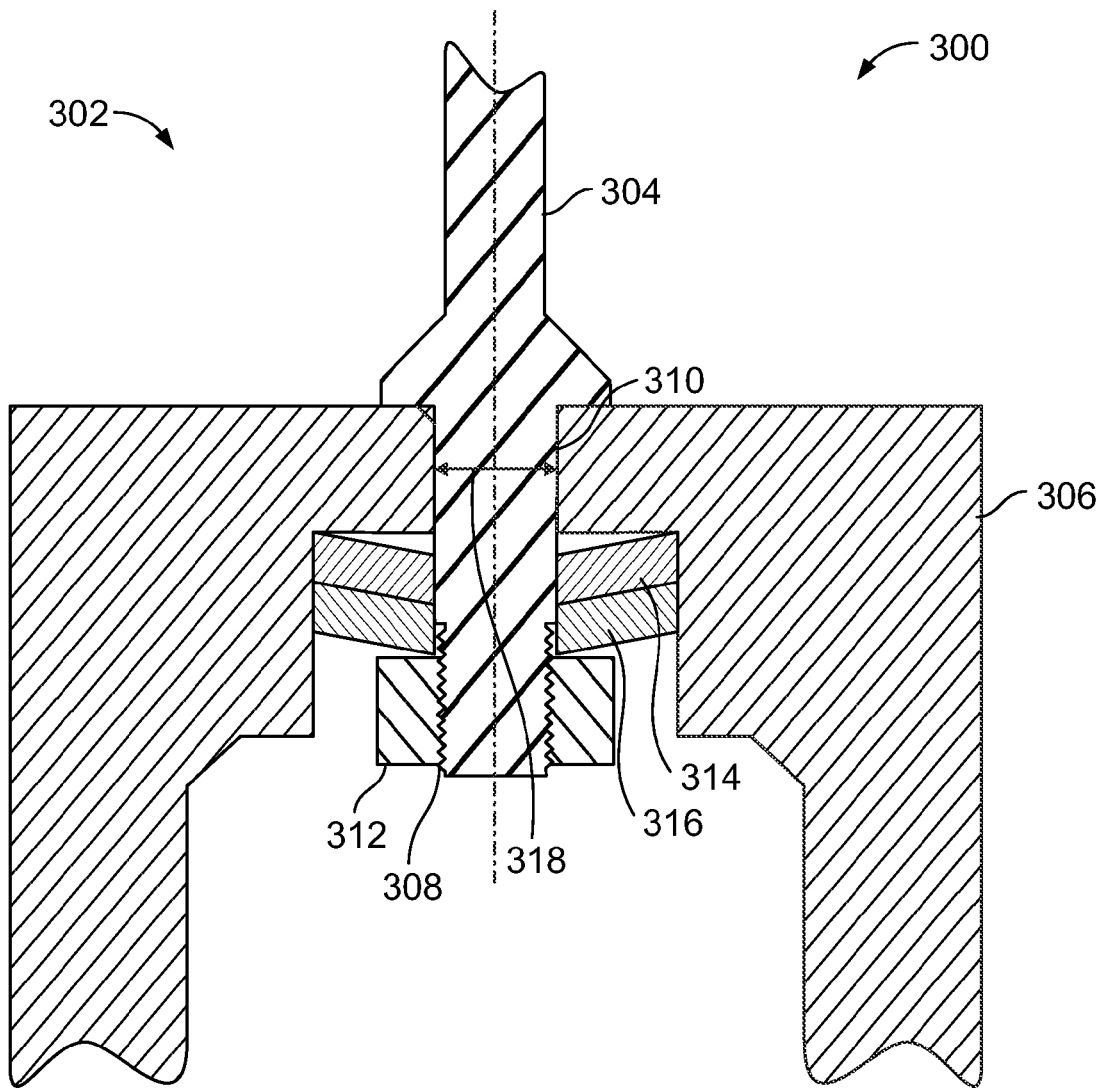
FIG. 3 is a cross-sectional view of another example thermally compensated valve trim apparatus.

FIG. 3 is a cross-sectional view of another example thermally compensated valve trim apparatus 300. As depicted in FIG. 3, the example valve trim apparatus 300 includes a thermally compensated valve stem connection 302. The example thermally compensated valve stem connection 302 shown in FIG. 3 mechanically couples or fastens a valve stem 304 to a valve plug 306. As shown in FIG. 3, a threaded end portion 308 of the valve stem 304 passes through an opening or aperture 310 of the valve plug 306 and a mechanical fastening element 312 (e.g., a nut) is used to load the valve stem connection 302 and prevent the valve stem 304 from rotating relative to the valve plug 306. Additionally, two spring washers 314 and 316, such as, for example, Belleville washers, are coupled to the valve trim apparatus 300 such that the spring washers 314 and 316 are captured between the valve plug 306 and the mechanical fastening element 312 along the valve stem 304. Alignment of the valve stem 304 with the valve plug 306 may be achieved by maintaining a tight tolerance between a diameter 318 of the valve stem 304 and the diameter of the opening 310 of the valve plug 306.

The example valve trim apparatus 300 of FIG. 3 includes the spring washers 314 and 316 to affect a load exerted on the valve stem connection 302 in response to a change in temperature (i.e., an elevated temperature due to operating conditions). At elevated temperatures, many known valve stem connections can experience failure (e.g., a failure of a threaded connection) due to conflicting thermal expansions between the valve stem 304 and the valve plug 306. The use of the spring washers 314 and 316 in the example valve trim apparatus 300 allows for temperature related dimensional changes of the valve stem connection 302 to be absorbed by the spring washers 314 and 316, thus maintaining the load at the joint and substantially reducing the likelihood of failure. In particular, the spring washers 314 and 316 can be engineered such that, as ambient or operating temperatures increase, a summation of the spring rates of each spring 314 and 316 can substantially compensate for the thermal expansions of the valve stem 304 and the valve plug 306 to maintain the integrity (e.g., tightness) of the valve stem connection 302. Further, while two spring washers 314 and 316 are shown in FIG. 3, any other number of spring washers or a single spring washer may be used as required for a given application and/or operating condition. Additionally, the two spring washers 314 and 316 are shown in series in FIG. 3. However, the spring washers may be combined in parallel or any combination of series and parallel as required for a given application and/or operating condition.

Figure 4:
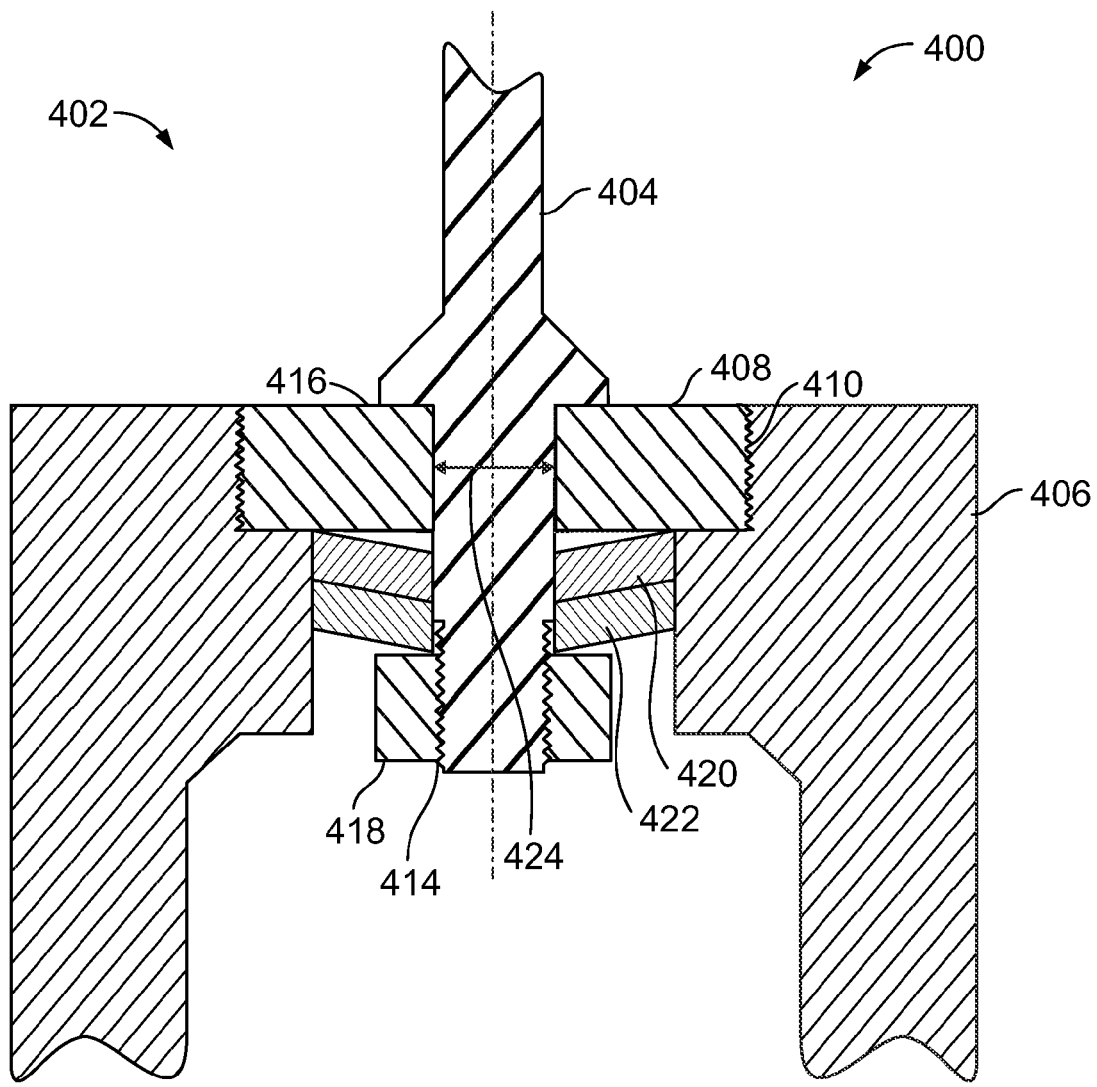
FIG. 4 is a cross-sectional view of yet another example thermally compensated valve trim apparatus.

FIG. 4 is a cross-sectional view of an example thermally compensated valve trim apparatus 400. As depicted in FIG. 4, the example valve trim apparatus 400 includes a thermally compensated valve stem connection 402. The example thermally compensated valve stem connection 402 shown in FIG. 4 mechanically couples or fastens a valve stem 404 to a valve plug 406. Similar to the example of FIG. 2, the example valve trim apparatus 400 also includes an insert 408 that is fixed within an opening or recess 410 of the valve plug 406. A wall of the recess 410 is threaded and a peripheral edge of the insert 408 is threaded to enable the insert 408 to be threadably engaged with the recess 410. Additionally, a pin (not shown), or any other fastening method, may be used to prevent the insert 408 from rotating and backing out or moving further into the valve plug 406.

As shown in FIG. 4, a threaded end portion 414 of the valve stem 404 passes through an opening or recess 416 of the insert 408 and a mechanical fastening element 418 (e.g., a nut) is used to load the valve stem connection 202 and prevent the valve stem 404 from rotating relative to the valve plug 406. Similar to the example of FIG. 3, spring washers 420 and 422 are coupled to the valve trim apparatus 400 such that the spring washers 420 and 422 are captured between the insert 408 and the mechanical fastening element 418 along the valve stem 404. Alignment of the valve stem 404 with the valve plug 406 may be achieved by maintaining a tight tolerance between a diameter 424 of the valve stem 404 and the diameter of the opening 416 of the insert 408.

The example valve trim apparatus 400 of FIG. 4 includes the insert 408 and the spring washers 420 and 422 to maintain the integrity of the valve stem connection 402 at elevated temperatures. To enable the example valve trim apparatus 400 to withstand such elevated temperatures, the insert 408 may be made of a high strength material, such as ASTM B637 NO7718, for example, Inconel 718, which maintains its strength at elevated temperatures. Additionally, utilizing a high strength insert 408 in the valve trim apparatus 400 eliminates the need to manufacture the entire valve plug 406 out of a high strength material, which is often expensive and unavailable in large, bar form for machining. The insert 408 utilizes a thread size that is significantly larger in diameter than a traditional valve stem connection, allowing for substantially more area over which the valve stem connection forces can be spread, resulting in reduced stresses on the plug material.

The example valve trim apparatus 400 of FIG. 4 includes the spring washers 420 and 422 to affect a load exerted on the valve stem connection 402 in response to a change in temperature (i.e., an elevated temperature due to operating conditions). At elevated temperatures, many known valve stem connections can experience failure (e.g., a failure of a threaded connection) due to conflicting thermal expansions between the valve stem 404 and the valve plug 406. The use of the spring washers 420 and 422 in the example valve trim apparatus 400 allows for temperature related dimensional changes of the valve stem connection 402 to be absorbed by the spring washers 420 and 422, thus maintaining the load at the joint and substantially reducing the likelihood of failure. In particular, the spring washers 420 and 422 can be engineered such that, as ambient or operating temperatures increase, a summation of the spring rates of each spring washer 420 and 422 can substantially compensate for the thermal expansions of the valve stem 404 and the valve plug 406 to maintain the integrity (e.g., tightness) of the valve stem connection 402. Further, while two spring washers 420 and 422 are shown in FIG. 4, any other number of spring washers or a single spring washer may be used as required for a given application and/or operating condition. Additionally, the two spring washers 420 and 422 are shown in series in FIG. 4. However, the spring washers may be combined in parallel or any combination of series and parallel as required for a given application and/or operating condition.

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
a valve plug having a recess;
an insert fixed in the recess and having an opening therein;
a valve stem having a threaded end disposed in the opening of the insert;
a fastener coupled to the threaded end to form a tight connection between the valve stem, the insert, and the valve plug; and
a spacer captured between the fastener and the insert, the spacer composed of a material having a thickness, the thickness of the material to change in response to a change in a temperature to at least maintain the tight connection throughout a stroke of the valve plug.

2. The apparatus of claim 1, wherein the fastener is to substantially prevent the valve stem from rotating relative to the valve plug.

3. The apparatus of claim 1, wherein the spacer comprises a first thermal coefficient, the valve plug comprises a second thermal coefficient, the first thermal coefficient being different than the second thermal coefficient to cause a load exerted on the valve stem connection to be substantially maintained or increased in response to an increase in temperature.

4. The apparatus of claim 1, wherein the spacer comprises stainless steel.

5. The apparatus of claim 1, further comprising a second spacer captured between the fastener and the insert to maintain the tight connection in response to the change in temperature.

6. The apparatus of claim 1, wherein the insert comprises ASTM B637 NO7718.

7. The apparatus of claim 1, wherein the insert is to threadably engage the valve plug.

8. The apparatus of claim 1, further comprising a pin to substantially prevent the insert from rotating relative to the valve plug.

9. The apparatus of claim 1, wherein the spacer is to affect a load exerted between the fastener and the insert in response to the change in temperature to maintain the tight connection.

10. An apparatus, comprising:
a valve plug having a recess;
an insert fixed in the recess and having an opening therein, the insert made of a first material having a greater strength than a second material of the valve plug;
a valve stem having a threaded end disposed in the opening of the insert to form a valve stem connection;
a spacer adjacent to the insert and operatively coupled to the valve plug and the valve stem to affect a load exerted on the valve stem connection in response to a change in temperature;
a second spacer operatively coupled to the valve plug and the valve stem to affect the load exerted on the valve stem connection in response to the change in temperature, wherein the first and second spacers have different thermal coefficients selected to cause the load exerted on the valve stem to be maintained or increased in response to an increase in temperature.

11. An apparatus, comprising, a valve plug;

a valve stem having a threaded end, the threaded end passing through a portion of the valve plug;

a fastener coupled to the threaded end to couple the valve stem to the valve plug and to prevent the valve stem from rotating relative to the valve plug throughout a stroke of the valve plug;

a washer captured between the fastener and the valve plug, a shape of the washer to change to maintain a tightness of a connection between the valve stem and the valve plug; and an insert fixed in a recess of the valve plug and having an opening therein to receive the threaded end of the valve stem, the insert comprising a first material and the valve plug comprising a second material, the first material having a greater strength than the second material.

12. The apparatus of claim 11, wherein the washer comprises a thermal characteristic to cause the tightness of the connection to be substantially maintained or increased in response to an increase in temperature.

13. The apparatus of claim 11, wherein the washer comprises a Belleville washer.

14. The apparatus of claim 11, further comprising a second washer captured between the fastener and the valve plug to maintain the tightness of the connection in response to a change in temperature.

15. The apparatus of claim 11, wherein the insert is to threadably engage the recess of the valve plug.

16. The apparatus of claim 11, wherein the first material comprises ASTM B637 NO7718.

17. The apparatus of claim 11, further comprising a pin to substantially prevent the insert from rotating relative to the valve plug.

18. An apparatus comprising:

a valve plug;

a valve stem having a threaded end, the threaded end passing through a portion of the valve plug;

a fastener coupled to the threaded end to couple the valve stem to the valve plug and to prevent the valve stem from rotating relative to the valve plug throughout a stroke of the valve plug; and a washer captured between the fastener and the valve plug, a shape of the washer to change to maintain a tightness of a connection between the valve stem and the valve plug, wherein the washer is to affect a load exerted between the fastener and the portion in response to a change in temperature to maintain the tightness of the connection.

* * * * *